United States Patent
Purcell et al.

[11] 3,923,111
[45] Dec. 2, 1975

[54] MULTIDIRECTIONAL RESILIENT SUSPENSION FOR VEHICLES

[75] Inventors: Robert J. Purcell, Washington; David J. Balzer, East Peoria; Rollin P. Van Zandt, Peoria, all of Ill.

[73] Assignee: Caterpillar Tractor Co., Peoria, Ill.

[22] Filed: Feb. 1, 1974

[21] Appl. No.: 438,665

[52] U.S. Cl. .............................. 180/9.54; 267/63 R
[51] Int. Cl.² ........................................ B62D 55/16
[58] Field of Search ................... 267/63 R; 180/9.54

[56] References Cited
UNITED STATES PATENTS

| | | | |
|---|---|---|---|
| 2,277,322 | 3/1942 | Heaslet | 180/9.54 |
| 2,960,350 | 11/1960 | Broughton | 267/63 R |
| 3,464,511 | 9/1969 | Coats | 180/9.54 |
| 3,537,696 | 11/1970 | Webster | 267/63 R |

*Primary Examiner*—Philip Goodman
*Attorney, Agent, or Firm*—Phillips, Moore, Weissenberger Lempio & Strabala

[57] ABSTRACT

The invention provides a suspension system for track-type vehicles. The system comprises a resilient assembly for mounting on the track roller frame of the vehicle which includes a tubular member having a stack of resilient pads therewithin and a plurality of spaced coaxial resilient members therearound. The mounted assembly effectively cushions relative vertical and horizontal movement between the track roller frame and main frame of the vehicle. An alternate embodiment includes a resilient assembly having a plurality of obliquely oriented resilient pads mounted upon the track roller frame to form a pocket for receiving a complimentary mating bracket secured to the main frame of the vehicle. The assembly effectively cushions horizontal and vertical relative movement between the main and track roller frames of the vehicle.

4 Claims, 4 Drawing Figures

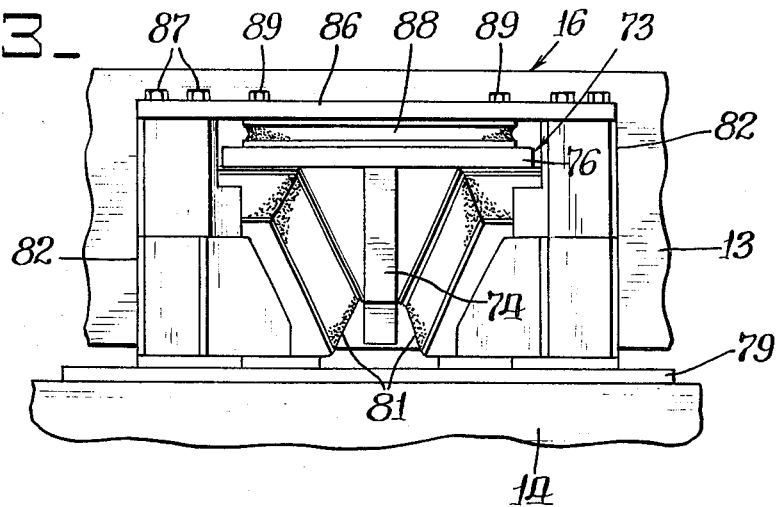
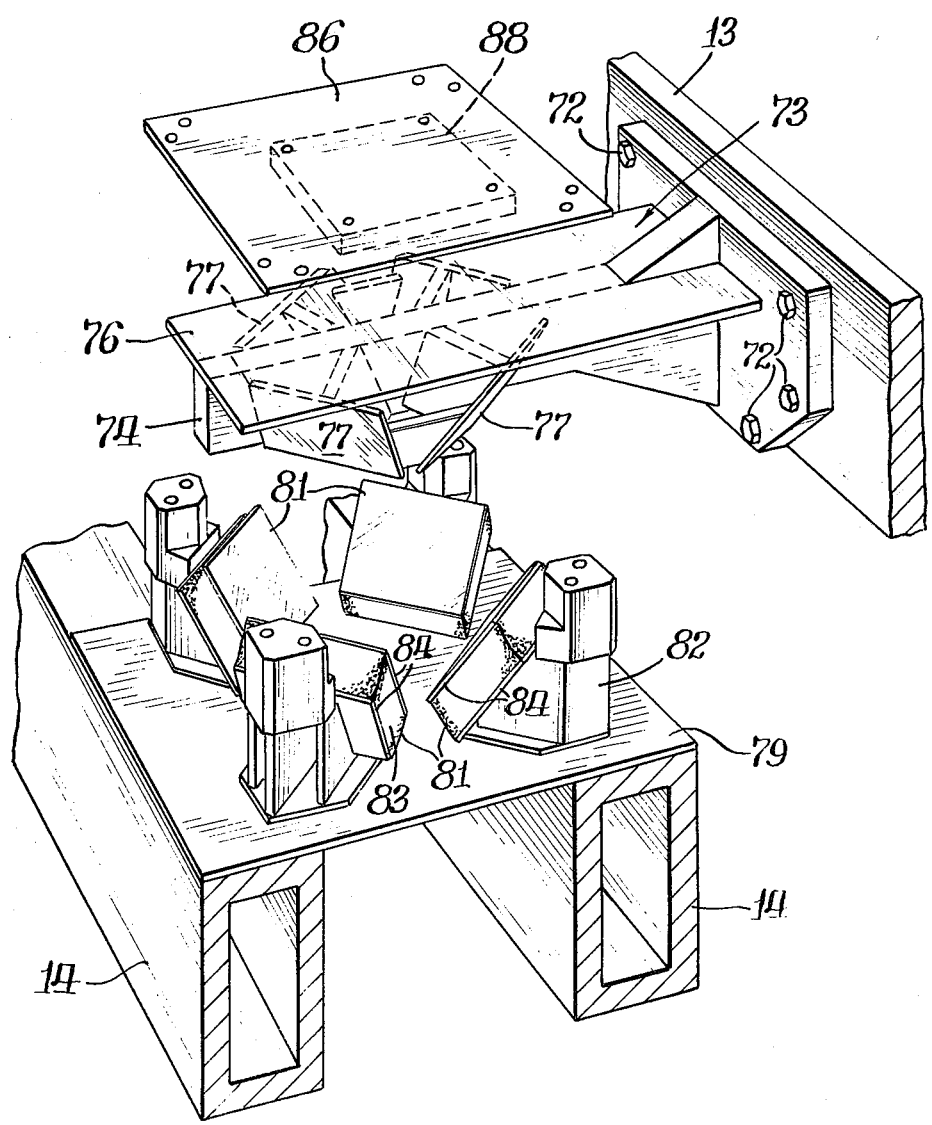

MULTIDIRECTIONAL RESILIENT SUSPENSION FOR VEHICLES

BACKGROUND OF THE INVENTION

This invention relates to a multidirectional resilient suspension system for vehicles. In particular, the invention relates to such a suspension system for relatively heavy tracked vehicles which includes a resilient mounting between the track roller frame and the main vehicle frame for cushioning both vertical and horizontal loads.

Many track-type vehicles such as crawler loaders commonly have a rigid connection between the vehicle main frame and the track roller frames for maximum stability and handling of the vehicle. However, with such rigid connections, the horizontal and vertical shock loads imposed upon the track roller frames during operation are transmitted directly to the main frame. This subjects the main frame to severe stresses, and results in an extremely rough ride for the vehicle operator.

Although previous attempts have been made to provide resilient suspension systems for track-type vehicles they have not been universally acceptable, since for loaders, in particular, these prior art systems have typically permitted too much movement between the track assemblies and the main frame, which movement has drastically reduced the stability and handling of the loader, especially when traversing uneven terrain with a loaded bucket. Such prior art suspension systems are exemplified by those disclosed in U.S. Pat. Nos. 2,126,707 to Schmidt; 2,445,723 to Brown; 3,307,855 to Doennecke; 3,482,852 to Hickman; 3,547,426 to Hart, of common assignment herewith; and 3,650,888 to Hirst; as well as British Pat. No. 1,199,274, published July 22, 1970.

SUMMARY AND OBJECTS OF THE INVENTION

The invention broadly provides a suspension system having particular use in conjunction with track-type vehicles such as crawler loaders and includes a resilient mounting assembly having a plurality of axially spaced, coaxial annular resilient members encircling a vertical stack of resilient compression pads. The assembly is secured between the main frame and the track roller frame of the vehicle to cushion horizontal and vertical relative movement between these frames.

In an alternate embodiment, the suspension system comprises a resilient mounting assembly including a plurality of obliquely-positioned resilient pads mounted on the track roller frame to form a pocket for receiving a mating bracket secured to the main frame. The assembly effectively cushions both horizontal and vertical movement between the two frames.

It is an object of the invention to provide a suspension system for tract-type vehicles which effectively cushions horizontal and vertical relative movement between the main and track roller frames of the vehicle.

It is another object of this invention to provide a suspension system for track-type vehicles which effectively cushions vertical movement of the track roller frame.

It is a further object of this invention to provide an effective suspension system for crawler loaders which effectively cushions vertical movement of the track roller frame and horizontal and vertical movement between the main and track roller frames of the loader, without appreciably adversely affecting the stability and handling of the loader.

Other objects and advantages of the invention will become apparent from the following description and drawing.

BRIEF DESCRIPTION OF THE DRAWING

FIG. 3 is an elevation of an alternate embodiment of the suspension system of this invention; and FIG. 4 is a partially exploded enlarged view of the embodiment of FIG. 3.

DETAILED DESCRIPTION

Figure 1:
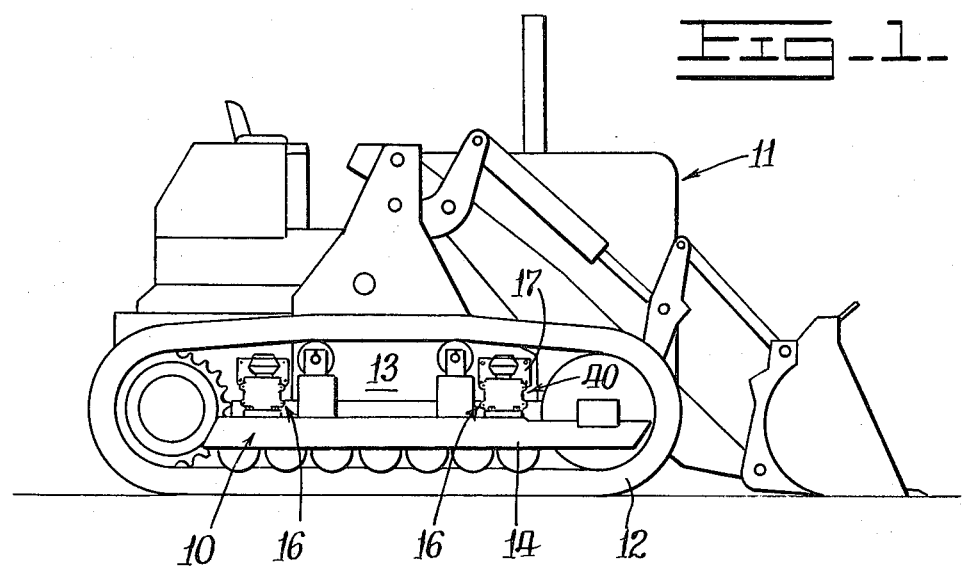
FIG. 1 is an elevation of a track-type vehicle provided with the suspension system of this invention.
Figure 2:
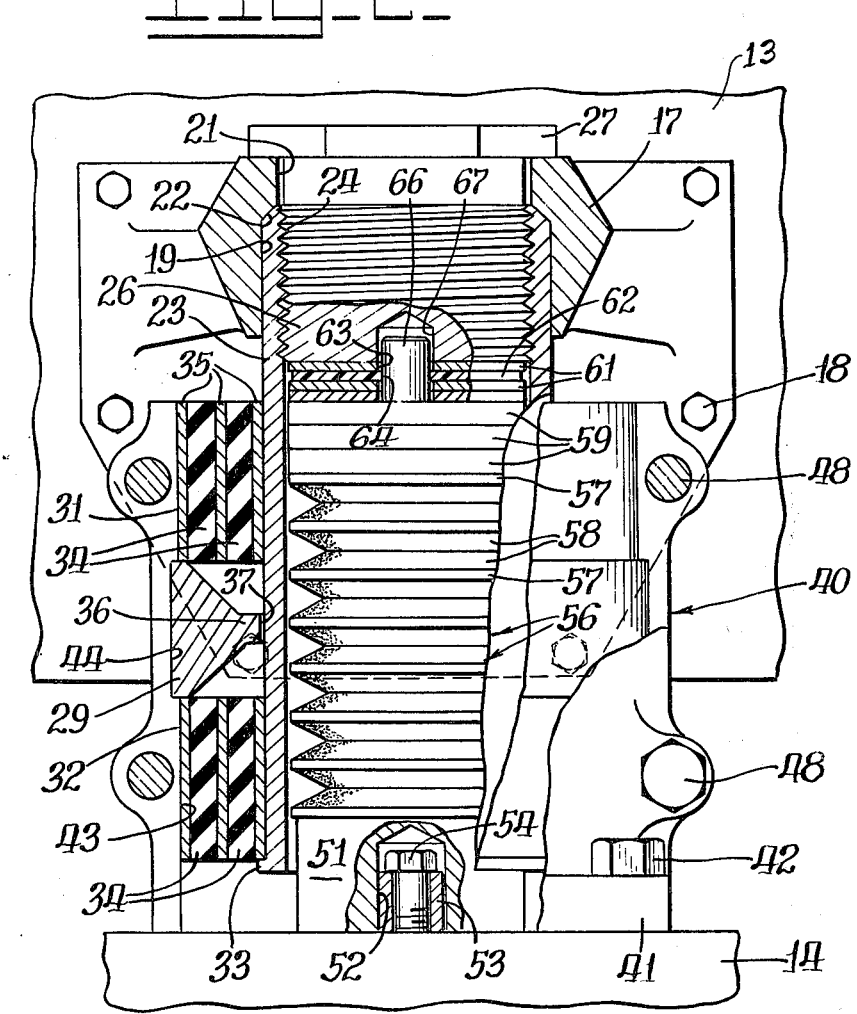
FIG. 2 is an enlarged partial sectional elevation of the suspension system of this invention.

With particular reference to FIGS. 1 and 2 of the drawing, a multi-directional resilient suspension is generally indicated by the reference numeral 10 in association with a vehicle such as a crawler loader 11. The vehicle includes a pair of laterally spaced track assemblies, one of which is shown at 12, disposed on opposite sides of a main frame 13. Each assembly has a track roller frame 14 secured to the main frame by a pair of resilient mounting assemblies 16.

Each resilient mounting assembly 16 includes a bracket 17 secured to the side of the main frame 13 by a plurality of bolts 18. The bracket 17 includes a pair of vertically aligned coaxial bores 19 and 21, with bore 19 terminating at a tapered shoulder 22. An upper end of a tubular member 23 is disposed within the bore 19 and is provided with an internal thread 24 which receives a threaded plug member 26 which extends through the bore 21. A head portion 27 of the plug engages the bracket 17 for securing the tubular member 23 to the bracket.

An annular spacer 29 is disposed between a pair of axially spaced annular resilient members 31 and 32 which circumnavigate and are suitably secured to the tubular member 23 as by a press fit therebetween. The lower resilient member 32 is positioned against a radial flange 33, extending outwardly from the lower portion of the tubular member 23. Each resilient member includes a pair of concentric resilient rings 34 interleaved between and bonded to radially spaced metal sleeves 35. The spacer 29 is provided with a centrally disposed web 36 having a bore 37 extending there-through. The diameter of the bore 37 is slightly greater than that of the tubular member 23, providing a space therebetween for a later defined purpose.

A coupling 40 has a flange 41 secured to the track roller frame 14 by plurality of bolts 42. A vertically disposed bore 43 is formed in the coupling in surrounding relation to the resilient members 31 and 32, with the spacer 29 disposed within an annular groove 44 formed within the bore 43. The coupling 40 consists of a pair of similar halves fastened together by a plurality of bolts 48 so that the coupling 40 is clamped onto the outer sleeves 35 of the resilient members.

A circular pedestal 51 is mounted on the track roller frame 14 and is provided with an aperture 52 which receives a guide bushing 53 secured to the track roller frame by means of a botl 54. The pedestal 51 extends into the tubular member 23 and supports a stack of circular resilient compression pads 56. The pads are of conventional design having a metal plate 57 and a resilient rubber or plastic cushion 58 bonded to one or both sides thereof. A plurality of spacers 59 and 61 are disposed between the resilient pads 56 and the threaded plug 26. A bearing 62 of synthane or similar self-lubricating material is disposed between two of the spacers 61. The spacers 61 and bearing 62 are provided with centrally disposed apertures 63 and 64, respectively. A guide pin 66 is disposed within the apertures and extends into a bore 67 formed in the threaded plug 26 for retaining the bearing 62 in proper alignment between the spacers 61.

During assembly, the resilient members 31 and 32 and the annular spacer 29 are pre-assembled onto the tubular member 23 and the coupling 40 clamped onto the resilient members. The coupling 40 is then secured to the track roller frame 14 and the bracket 17 positioned so that the upper end of the tubular member engages the bore 21. The pedestal 51, resilient pads 56, spacers 59 and 61, and the bearing 62 are positioned within the tubular member 23 in the stacked relation as shown in FIG. 2. The pin 66 is then inserted into the apertures in the bearing 62 and spacers 59 and 61, and the threaded plug 26 inserted into the internal threads 24 of the tubular member 23, and torqued down to secure the tubular member to the bracket 17 and preload the resilient pads 56. The bracket 17 is then secured to the side of the main frame 13 by the bolts 18. In the static condition, the inner sleeves 35 of the resilient members 31 and 32 are preferably spaced equally from the web 36. The pre-load on the resilient pads 56 may be adjusted by adding or removing one or more of the spacers 59 or 61. The bearing 62 reduces the frictional drag when the plug 26 is being threaded into the tubular member 23.

When the vehicle is in operation, the resilient pads 56 cushion the vertical upward movement of the track roller frame 14 such as occurs when the tracks run over a rock, log, etc., with extra cushioning being provided by the resilient members 31 and 32. Also, the resilient pads 56 cushion the downward movement of the vehicle frame 13 such as occurs when the bucket is loaded. Any movement between the track roller frame 14 and main frame 13 tending to separate the bracket 17 from the coupling 40 is cushioned by the resilient members 31 and 32. Vertical movement in either direction is limited by contact between the inner sleeves 35 of the resilient members 31 and 32 and the web 36 of the spacer 29. The resilient members 31 and 32 also cushion relative horizontal movement and limit such movement by lateral contact between the tubular member 23 and the bore 37 of the web.

An alternate embodiment of the resilient mounting 16 is illustrated in FIGS. 3 and 4. This resilient mounting includes a vertical rib 74 welded to the lower side of a horizontal plate 76 to form an arm 73 attached to the main frame by means of bolts 72. A plurality of plates 77 are secured to the lower side of the plate 76 at obliquie angles, preferably to approximate trapezoidal sides of an inverted truncated pyramid. Various plates and gussets are included for further strengthening of the arm.

A mounting pad 79 is suitably secured to the track roller frame 14 vertically below the arm 73. A plurality of resilient pads 81 are each secured to an upwardly extending pedestal 82 secured to the mounting pad 79 with the resilient pads 81 forming a pocket which is shaped to receive the plates 77 of the arm 73. Each of the resilient pads 81 includes a resilient rubber cushion 83 bonded between a pair of metallic plates 84. A retaining plate 86 is secured to the pedestals 82 by a plurality of bolts 87. A resilient pad 88 is secured to the retaining plate by a plurality of bolts 89 and is disposed between the retaining plate and the arm 73.

During vehicular operation, the resilient pads 81 cushion or absorb the realtive vertical movement between the track roller frame 14 and the main frame 13 which tends to move the arm 73 toward the mounting pad 79 while the resilient pad 88 cushions the vertical movement tending to move the arm away from the mounting pad 79. Also, the resilient pads 81 cushion the relative horizontal movements occurring between the track roller frame 14 and the main frame 13.

In view of the foregoing, it should be apparent that the present invention provides an improved and efficient suspension system for track-type vehicles. The resilient assembly effectively cushions most relative motion between the track roller frame and main frame of the vehicle, and further, is not detrimental to the stability and handling of the vehicle.

While the invention has been described with particular reference to the preferred embodiments, it is apparent that various modifications and variations are possible within the purview of the inventive concepts. No limitation with respect to such variations and modifications as intended, except by the scope of the appended claims.

We claim:

1. A resilient suspension system for a track-type vehicle having a main frame and a track roller frame including; a hollow tubular member, annular resilient means disposed around the exterior said tubular member for cushioning lateral movement between said main and roller frames, resilient pad means disposed in stacked relation within the hollow interior of said tubular member for cushioning vertical relative movement between said frames, including first coupling means for supportingly surrounding said annular resilient members and for mounting said annular resilient members and said tubular member upon said roller frame, bracket means secured to said main frame for supporting a portion of said tubular member for movement relative to said first coupling means.

2. The invention of claim 1 wherein said annular resilient means include first and second axially spaced annular resilient members, spacer means disposed axially between said first and second annular resilient members, said annular resilient members including a resilient ring member bonded to a metallic sleeve member.

3. A resilient suspension system for a track-type vehicle having a main frame and a track roller frame including; a hollow tubular member, annular resilient means disposed around said tubular member for cushioning lateral movement between said main and roller frames, resilient pad means disposed in stacked relation within the hollow interior of said tubular member for cushioning vertical relative movement between said frames, first coupling means for supportingly surrounding said annular resilient members and for mounting said annular resilient members and said tubular member upon said roller frame, bracket means secured to said main frame for supporting a portion of said tubular member for movement relative to said first coupling means, said annular resilient means including first and second axially spaced annular resilient members, spacer means disposed axially between said first and second annular resilient members, said annular resilient members including a resilient ring member bonded to a metallic sleeve member, said spacer means including a web portion having a central bore therein for receiving said tubular member therethrough, said central bore having a diameter greater than that of said tubular member to permit said tubular member to move both laterally and axially within said central bore.

4. The invention of claim 3 further including plug means for closing one axial end of said hollow tubular member, at least one spacing element between said resilient pad means and said plug means, said plug means concurrently engaging said bracket means, said spacing elements, and said tubular members for securing said tubular member to said bracket means while selectively pre-loading said resilient pad means.

* * * * *